United States Patent

[11] 3,616,029

| [72] | Inventor | Samuel Lerman |
| | | St. Louis, Mo. |
| [21] | Appl. No. | 754,264 |
| [22] | Filed | Aug. 21, 1968 |
| [45] | Patented | Oct. 26, 1971 |
| [73] | Assignee | Milbern Company |
| | | St. Louis, Mo. |

[54] METHOD FOR FORMING A RESILIENT PAD FROM A PLURALITY OF PLASTIC FOAM SHEET MEMBERS
7 Claims, 6 Drawing Figs.

[52] U.S. Cl............................................ 156/276,
156/219, 156/306, 156/309, 156/312
[51] Int. Cl..................................................... B32b 31/06,
B32b 31/12
[50] Field of Search.......................................... 156/62.2,
62.6, 219, 228, 276, 312, 288, 300, 309

[56] References Cited
UNITED STATES PATENTS
| 2,361,751 | 10/1944 | Donovan...................... | 156/276 X |
| 2,991,208 | 7/1961 | Stieger.......................... | 156/276 X |

*Primary Examiner*—Carl D. Quarforth
*Assistant Examiner*—S. R. Hellman
*Attorney*—John D. Pope, III ABSTRACT: The method for forming a resilient pad from a plurality of plastic foam sheet members comprises stacking a plurality of such sheet members above one another within a press with their adjacent surfaces touching, compressing the sheet members together under an initial pressure of from 5 pounds to 20 pounds per square inch, applying heat to the sheet members until they reach a uniform temperature throughout their thicknesses of from 250°–300° F., increasing the pressure exerted by the press on the sheet members to between 30 and 100 pounds per square inch to cause the sheet members to fuse together into a pad of unitary construction. A second embodiment of the invention includes sandwiching a layer of shredded foam materials between the sheet members before the application of heat and pressure. Fibrous materials selected from the group consisting of glass fibers, acrylic fibers, cotton, jute, wool, and sisal may be mixed with a catalyzed resin and sandwiched between plastic foam sheet members before the application of heat and pressure.

PATENTED OCT 26 1971 3,616,029

INVENTOR
SAMUEL LERMAN
BY
ATTORNEY

METHOD FOR FORMING A RESILIENT PAD FROM A PLURALITY OF PLASTIC FOAM SHEET MEMBERS

This invention relates to plastic foams and more particularly to a method for forming a resilient pad from a plurality of plastic foam sheet members.

Plastic foams lend themselves to a wide variety of uses. Many of the uses require plastic foams which vary in thickness, rigidity, resiliency and density. Some examples of uses to which plastic foam pads are put are: as an underlay for carpet; for packaging fragile objects; and as insulation. In order to provide pads for these various uses, manufacturers of plastic foam products need to be able to produce products having a wide variety of shapes and characteristics. One way of providing pads having different characteristics is to join a plurality of plastic foam sheet members together. However, in order to join sheet members having any substantial thickness it has heretofore been necessary to use a glue, binder, or other adhesive. This invention provides methods for joining a plurality of plastic foam sheet members without the use of glues, binders, or other adhesives. Instead the sheet members are joined by a fusion process wherein the resulting pad is of unitary construction.

Among the several objects of the present invention may be noted the provision of a method for joining a plurality of plastic foam sheet members without the use of glues, binders, or other adhesives; the provision of a method of joining a plurality of plastic foam sheet members with shredded plastic foam materials sandwiched therebetween; the provision of a method for sandwiching certain scrap materials between a plurality of sheet members to vary the rigidity of the sheet members; the provision of a method for forming a resilient pad wherein the resiliency, density and thickness of the pad may be varied according to choice; the provision of a method for forming a resilient pad wherein the pad is shaped and molded into any desired shape; and the provision of a resilient pad which contains indentations therein for increasing the "loft" of the pad. Other objects and features will be in part apparent and in part pointed out hereinafter.

The invention accordingly comprises the methods hereinafter described, the scope of the invention being indicated in the following claims.

In the accompanying drawings, in which several of various possible embodiment of the invention are illustrated, FIG. 1 illustrates a press with a plurality of plastic foam sheet members inserted therein;

Corresponding reference characters indicate corresponding parts throughout the several views of the drawings.

Figure 1:
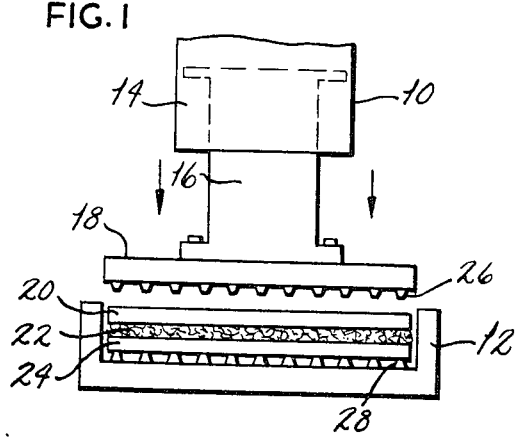

This invention relates to plastic foams which are resilient and "springy" in nature. Examples of these plastic foams are latex foam, polystyrene foam, polyvinyl chloride foam, and polyurethane foams.

The first embodiment of the method of this invention includes stacking a plurality of plastic foam sheet members on top of one another. The stack of plastic foam sheet members may vary in thickness up to a thickness of approximately 10 inches. The number and thicknesses of the sheet members may vary according to choice, depending upon the required characteristics of the finished product. For example, if a very thick pad is desired, it is necessary to stack the plastic foam sheet members to a greater thickness. If it is desired to provide a pad which will have a very high density, it is necessary to compress a thick stack of plastic foam sheet members into a pad member which has a smaller thickness than the original stack of sheet members.

After the plastic foam sheet members have been stacked, they are placed in a platen press which has been preheated to a temperature of between 250°–350° F. The platen press is then closed and is activated to exert an initial pressure of from 5 to 20 pounds per square inch on the stacked sheet members. The preferred pressure during this preheating stage is approximately 10 pounds per square inch. It is extremely important that at least a slight amount of pressure be exerted on the stack during this time in order to facilitate the heating of the sheet members throughout their thicknesses. The pressure causes the heat to permeate the stack of sheet members more quickly than if there were no pressure. The temperature which is applied to the stack of plastic foam sheet members is not sufficient to melt the sheet members but is only hot enough to cause them to approach their melting point, thereby causing them to be malleable and workable, but not causing them to melt and liquify. Without the application of pressure during the preheating stage the sheet members would tend to resist the permeation of heat through the thickness of the stack, the outer sheet members insulating the inner sheet members from the heat. The application of a slight pressure during the preheating stage allows the heat to permeate the stack substantially completely in a short time. It makes possible the fusion of stacks as thick as 10 inches. Depending upon the original thickness of the stack of sheet members, it takes from 5 seconds to 5 minutes to preheat the stack of sheet members so that it is of uniform temperature throughout its thickness.

The next step of the process is a high-pressure step and involves increasing the pressure exerted upon the stack of sheet members to a pressure between 30 and 100 pounds per square inch. This increased pressure compresses the plurality of sheet members together at their junctures, thereby causing a fusion between the sheet members to form a pad of unitary construction. The increased pressure also causes the stack of sheet members to be permanently reduced in thickness, thereby increasing their density. After the completion of this step the pad permanently retains a reduced thickness and increased density. The preheating of the stack of sheet members to a malleable state and the compression of the stack under high pressure work together to cause the fusion of the sheet members and their permanent increased density.

The increased pressure during the high-pressure step is exerted for a period varying from 5 seconds to 3 minutes, depending upon the required density and thickness of the resultant pad. It is possible to fuse several stacks having the same density and thickness into pads having a variety of densities and thicknesses by varying the factors of heat, pressure, and the time which they are applied. By increasing any one or any combination of these factors it is possible to increase permanently the density of the resulting pad and to reduce its thickness. Also, as the original thickness of the stack of sheet members is increased, it is necessary to apply a higher pressure over a longer period of time in order to produce a satisfactory fusion at the juncture between the sheet members.

Referring to FIG. 1, numeral 10 designates a press having a base platen 12, a hydraulic cylinder 14, a hydraulic piston 16 and an upper press platen 18. Hydraulic cylinder 14 is of conventional construction and is adapted to move upper platen 18 dowardly with respect to base platen 12 to exert pressure therebetween. The hydraulic press is shown for illustrative purposes only, and any type of press capable of exerting the required pressure is satisfactory. Two plastic foam sheet members 20, 24, are illustrated as resting between upper platen 18 and base platen 12 and having scrap materials 22 sandwiched between them. Upper platen 18 has a plurality of lugs 26 projecting downwardly toward sheet members 20, 24, and base platen 12 similarly has lugs 28 projecting upwardly toward sheet members 20, 24. These lugs form depressions in the stack of sheet members during the fusion process, thereby causing the resulting pad to have portions which are of high density and portions which are of a lower density.

Figure 3:
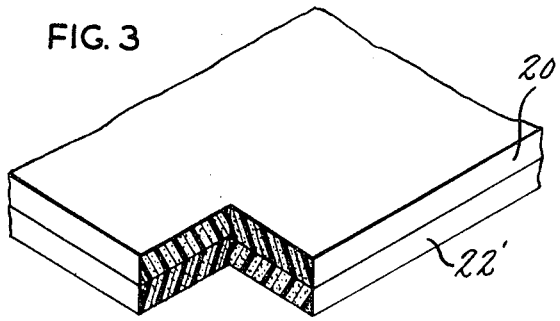
FIG. 3 illustrates two polyurethane or polyester sheet members stacked on one another before being joined by the method of this invention.
Figure 4:
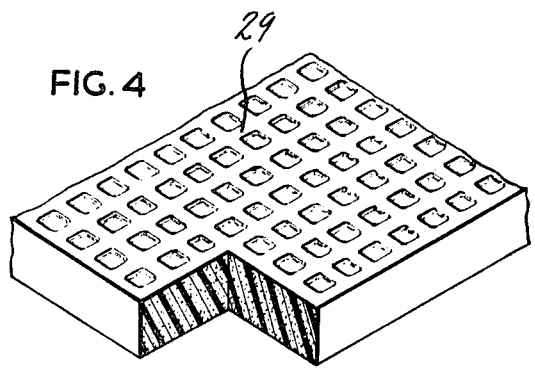
FIG. 4 illustrates a pad of unitary construction which has been formed from the two sheet members of FIG. 3.

FIG. 3 illustrates two plastic foam sheet members 20', 22', which have been stacked upon one another before the fusion process. FIG. 4 illustrates a pad 29 which results from sheet members 20', 22', after the fusion process. It will be noted that the juncture between the two components is no longer visible after the process is complete, the resulting pad being of a unitary construction. In addition, it will be noted that pad 29 has a pattern of depressions on its surface caused by lugs 28. This pattern of depressions makes the pad adaptable as a superior carpet underlay because the depressions on the surface of the pad permit the pad to be compressed more than would be possible if there were no depressions. The ability of pads to be yieldably compressed a great distance and to return to their original shape is commonly referred to in the carpet underlay industry as "loft." The pattern of depressions in the pad increases its "loft," thereby imparting a soft springy feeling to carpets when the pad is used as a carpet underlay. The pattern of depressions may vary according to choice and the process of this invention is not limited to the pattern illustrated in the drawings.

The second embodiment of this invention concerns sandwiching shredded materials between a plurality of layers of plastic foam sheet members. The materials sandwiched between the plastic foam sheet members may be shredded scraps of plastic foam or they may be shredded fibrous materials. When shredded plastic scraps are used, the process is similar to that described for the first embodiment of this invention. The shredded materials are inserted between two plastic foam sheet members. This sandwich is then put in a heated press under a pressure of from 5 to 20 pounds per square inch for the preheating stage. The sandwich is maintained at this pressure for from 5 seconds to 5 minutes until the sheet members and the shredded foam are evenly heated throughout the thickness of the sandwich to a malleable state. Then the increased pressure of from 30 to 100 pounds per square inch is applied for a period of time ranging from 5 seconds to 3 minutes to cause the sandwich to fuse into a pad of unitary construction. The layer of shredded plastic foam scraps produces a layer in the resulting pad which is more dense and more rigid than the layers produced by the sheet members. Thus the shredded plastic foam particles cause the pad to have a greater density in its center and to be more rigid than the pad produced by the first embodiment.

Figure 5:
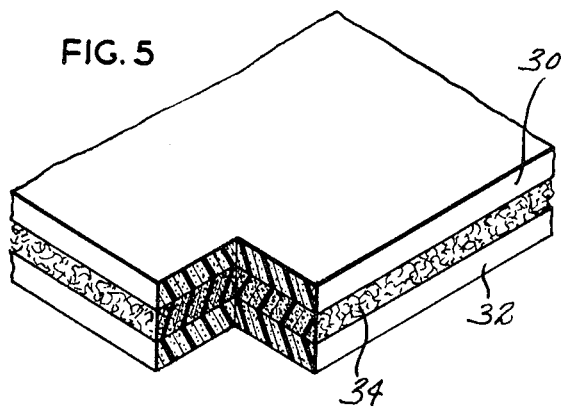
FIG. 5 illustrates two sheet members with scrap materials sandwiched therebetween.
Figure 6:
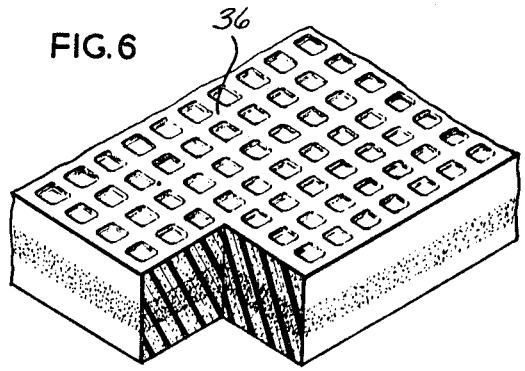
FIG. 6 illustrates the components of FIG. 5 after they have been fused into a unitary construction by the method of this invention.

A sandwich may also be produced utilizing shredded particles of fibrous materials. Examples of such materials are rubber scraps; synthetic fibrous materials such as fiber glass or acrylic fibers; and natural fibrous materials such as cotton, jute, sisal and hemp. Scraps of polyurethane or other shredded plastic foam materials may also be included. However, when fibrous materials other than plastic foam materials are used it is necessary to mix these materials with a liquid resin and to add a catalyst to the mixture before sandwiching it between layers of plastic foam sheet members. The sandwich is placed in a press and the preheating and high-pressure steps described above are applied. The application of heat and pressure aids the catalyst in causing the resin to harden. The hardening of the resin causes fibrous materials to form a bond between the two plastic foam sheet members. The hardened mixture of resin and fibers imparts rigidity to the resulting pad and also creates a strong bond between the sheet members. The platens of the press cause the plastic foam within each sheet member to be compressed permanently, thereby increasing the density of the resulting pad. In addition, the lugs on the platens of the press create depressions on the surface of the pad. FIGS. 5 and 6 illustrate two layers 30, 32, of plastic foam sheet members with shredded fibrous materials 34 sandwiched therebetween. FIG. 5 illustrates this sandwich before the process and FIG. 6 illustrates the pad 36 which results from the process.

In both the first and second embodiments of the method of this invention the shape of the press may be varied to form the resulting pad into any desired shape. For example, a pad may be molded with a depression in the shape of a glass jar for receiving a glass jar and protecting it against breaking during shipment.

The first embodiment of this invention provides for the joining of a plurality of plastic foam sheet members without the utilization of glues, binders, or other adhesives. The resilient pad is produced by fusing the plurality of sheet members by the application of heat and pressure. The process provides manufacturers of plastic foam materials a wide flexibility in producing products of various thicknesses, densities, and shapes. Sheet members may be fused together by this process into pads having thicknesses as great as 10 inches.

The second embodiment of this invention provides a process for sandwiching either shredded foam materials or shredded fibrous materials between plastic foam sheet members to produce a resilient pad having an increased density in its center and having a greater rigidity than the pad produced by the first embodiment.

Figure 2:
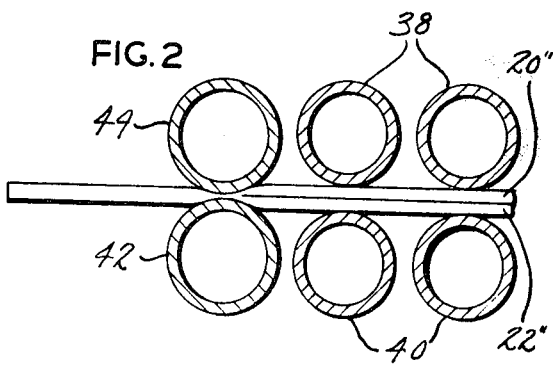
FIG. 2 illustrates an alternative method for applying heat and pressure to the sheet members.

FIG. 2 illustrates the use of rollers rather than a platen press for applying heat and pressure to the stack of sheet members. The preheating stage of the process is accomplished by a plurality of upper rollers 38 and lower rollers 40, both of which are preheated. Upper rollers 38 and lower rollers 40 are spaced apart so as to receive sheet members 20'' and 22'' therebetween for applying a pressure of from 5 to 20 pounds per square inch. Additional rollers 42 and 44 are spaced more closely together than rollers 38 and 40 so as to provide an increase in pressure on sheet members 20'' and 22''. Thus when sheet members 20'' and 22'' are fed continuously between rollers 38, 40, they are subjected to a small pressure and to a temperature of from 250°–350° F. After they are preheated they are fed between rollers 42, 44, and are subjected to an increased pressure which causes them to fuse and become a pad of unitary construction.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. A method for forming a resilient pad from a plurality of plastic foam sheet members comprising stacking a plurality of plastic foam sheet members above one another with their adjacent surfaces touching; compressing said sheet members together under an initial pressure of from approximately 5 pounds per square inch to 20 pounds per square inch; applying heat to said sheet members by contacting the top and the bottom of the stack with a surface at a temperature of between 250°–350° F. until said sheet members reach a uniform temperature throughout their thicknesses of from approximately 250°–350° F., said initial pressure aiding the penetration of heat throughout the thicknesses of said plurality of sheet members; increasing the pressure exerted on said sheet members to approximately 30 to 100 pounds per square inch, whereupon the application of heat and pressure causes said sheet members to fuse together into a pad of unitary construction and causes said sheet members to be permanently decreased in thickness and increased in density and resiliency.

2. The method of claim 1 including applying pressure unevenly to the surfaces of said heated sheet members to cause a pattern of depressions to be formed in said sheet members, whereupon said sheet members have increased density at said depressions.

3. The method of claim 1 including inserting said sheet members into a platen press for the application of heat and pressure, said platen press being preheated.

4. The method of claim 1 including sandwiching a layer of shredded foam materials between said sheet members before the application of heat and pressure, whereupon the application of heat and pressure to said sheet members with said shredded foam materials sandwiched therebetween causes said sheet members and said shredded foam materials to fuse together into a single pad of unitary construction.

5. The method of claim 1 including sandwiching between said sheet members of mixture of heat hardenable resin mixed with fibrous materials selected from the group consisting of glass fibers, acrylic fibers, cotton, jute, wool, and sisal, whereupon the application of heat and pressure to said sheet members with said mixture sandwiched therebetween aids the solidification of said mixture to form a bond between said sheet members.

6. The method of claim 1 including feeding said sheet members continuously between a series of rollers or a roller press, said rollers applying heat and pressure simultaneously.

7. The method of claim 6 including using a first set of rollers to apply said initial pressure on said stack of plastic foam sheet members, and using a second set of rollers to increase the pressure on said stack of plastic foam sheet members.

* * * * *